United States Patent Office 3,028,213
Patented Apr. 3, 1962

3,028,213
MEASURING AND RECORDING INTEGRATOR
HAVING CONTROL MEANS
William K. Hall, Mount Lebanon Township, Gustave A. Sill, Wilkins Township, and Court L. Wolfe, Ross Township, all in Allegheny County, Pa., assignors to Gulf Research & Development Company, Pittsburgh, Pa., a corporation of Delaware
Filed Oct. 8, 1957, Ser. No. 688,941
11 Claims. (Cl. 346—33)

The present invention relates to apparatus for recording and integrating, and more particularly pertains to such apparatus employing a conventional integrator mechansim.

As is well known, the conventional mechanical integrating device comprises a rotatable disk, a cylinder rotatable upon an axis normal to the axis of rotation of the disk, and motion transferring means disposed between the disk and the cylinder establishing a driving connection between the disk and the cylinder, wherein the ball means is movable along a path parallel to the axis of the cylinder.

Briefly, one aspect of the invention comprises the provision of means for rotating the disk together with means connected to the motion transferring means for interrupting operation of the disk rotating means upon the motion transferring means occupying a predetermined position whereby, for example, the disk can be caused to cease rotation whenever the motion transferring means is at or in close proximity to the center of the disk.

Still another aspect of the invention comprises the means for rotating the disk being electrically actuated and electrically actuated means for producing an electrical signal upon each equal increment of angular displacement of the cylinder, together with means connected to the motion transferring means for de-energizing both the means for rotating the disk and for producing the electrical signals upon the ball means occupying a predetermined position, whereby the disk can be caused to cease to rotate and the production of electrical signals discontinued whenever the motion transferring means is, for example, disposed at or in close proximity to the center of the disk.

Still another aspect of the invention involves the provision of means for making a distinct measurement of the angular displacement of the cylinder during each time interval initiating upon the motion transferring means occupying a first fixed position and terminating upon the motion transferring means subsequently occupying a second fixed position. In the preferred embodiment of this aspect of the invention, the means for making the measurement comprises means for producing an electrical signal upon each equal increment of angular displacement of the cylinder, means resettable to zero for counting the electrical signal pulses so produced, and means connected to the ball means for resetting the counting means to zero upon predetermined movement of the motion transferring means.

The invention will be more fully appreciated upon reference to the following description of a preferred embodiment of the invention illustrated in the drawings, wherein.

Figure 1:
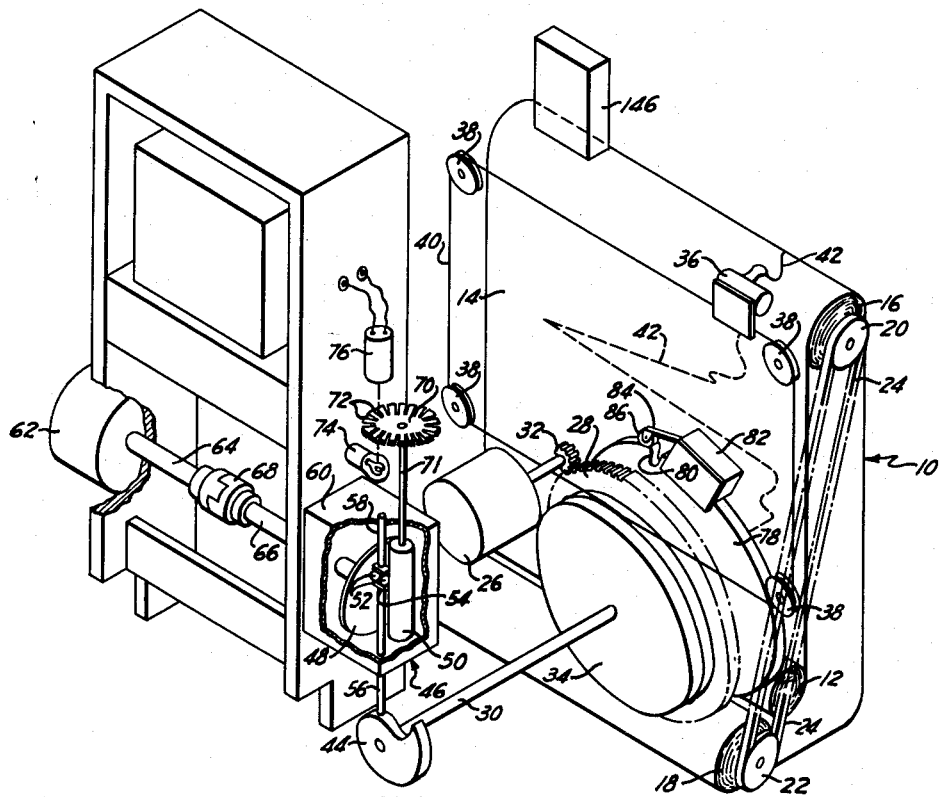
FIGURE 1 is a perspective view of the preferred embodiment of the invention, the same having portions broken away to expose concealed portions of the same and having certain hidden parts shown in dashed outline.

Referring to FIGURE 1, the numeral 10 indicates generally a self-balancing potentiometric recorder, which can be a conventional self-balancing electronic strip chart recorder, such as manufactured by Leeds and Northrup designated Model G. The recorder 10 comprises a supply roll of chart paper 12 from which chart paper 14 is entrained over a roll 16 and takeup roll 18. The rolls 16 and 18 are provided with pulleys 20 and 22, respectively, over which a belt 24 is entrained, and means, not shown, is provided for driving the rolls 16 and 18 at such a rate that the speed of advance of the chart paper 14 over the roll 16 is constant. Though not shown, it will be understood that means are provided to maintain tension on the chart paper 14 as it passes between the rolls 16 and 18.

The balancing motor 26 of the conventional self-balancing electronic strip chart recorder 10 is drivingly connected to a spur gear 28 fixed upon a slide wire shaft 30 by means of a small pinion gear 32 carried on the shaft of the motor 26. Secured to the slide wire shaft 30 in a position adjacent the gear 28 is a drum or disk 34 by means of which a recording pen 36 is driven in relation to the chart paper 14 as it passes over the roll 16. The arrangement for driving the pen 36 from the drum 34 comprises four idler pulleys 38 over which an endless pen drive cable 40 is entrained, with the portion of the cable 40 passing between the lowermost of the pulleys 38 being looped about the drum 34, as shown. The recording pen 36 is secured by any suitable means to the cable 40 at a position intermediate the uppermost of the pulleys 38, it being understood that the pen 36 is provided with suitable guiding means to maintain the same in proper contact with the chart paper 14.

Thus, the motor 26 rotates the slide wire shaft 30 through the driving connection established by the gears 28 and 32. The shaft 30 in turn causes the drum 34 to rotate therewith, thus causing linear movement of the cable 40 and the pen 36, so that the pen 36 marks upon the chart paper 14 a tracing 42 which is equivalent to a record of the angular displacement of the shaft 30 versus time. It will be understood of course that inasmuch as the angular position of the shaft 30 is directly proportional to the value of the variable electrical input signal being recorded, so that the trace 42 constitutes a record of such input signal versus time.

As thus far described, the recorder 10 is entirely conventional and the operation thereof is well understood by those skilled in the art. The description of apparatus for integrating the angular displacement of the shaft 30 (the angular displacement of the shaft 30 being proportional to the instantaneous value of the input signal being recorded) with respect to time follows.

The shaft 30 has fixed thereon a constant rise cam 44. A conventional mechanical integrating device is indicated generally at 46, the same comprising a disk 48, a cylinder 50 mounted to rotate about an axis normal to the axis of the disk 48, and a pair of balls 52 disposed between the disk 48 and the cylinder 50. The pair of balls 52 constituting motion transferring means establish a frictional driving connection between the disk 48 and the cylinder 50 and are carried in a sleeve 54. The sleeve 54 is secured at one side to a cam follower 56 and at the other side to a support arm 58. The cam follower 56 and the support arm 58 slidably extend through suitable openings in the opposite sides of a housing 60 provided for the integrating device 46, the arrangement being such that the pair of balls 52 are free to travel only along a path parallel to the axis of the cylinder 50.

The end of the cam follower 56 remote from the pair of balls 52 slidingly engages the constant rise cam 44. If deemed necessary or expedient, spring or weighting means, not shown, can be provided for yieldingly urging the cam follower 56 into continuous engagement with the cam 44. As thus far described, it will be evident that the pair of balls 52 will be caused to move along a path parallel to the axis of the cylinder 50 to an extent proportional to the angular displacement of the shaft 30. Normally, the position of the cam 44 on the shaft 30 or the length of the cam follower 56 is such that the pair of balls 52 is positioned centrally of the disk 48 when the shaft 30 is in the angular position occupied by it when the value of the input signal is zero.

Means is provided for rotating the disk 48 which comprises a constant speed electric motor, such as the synchronous motor indicated at 62, such motor 62 being drivingly connected to the disk 48 by means of a motor shaft 64, and a shaft 66 centrally secured to the disk 48, with the adjacent ends of the shaft 64 and 66 being coupled together as at 68.

Means is provided for measuring the angular displacement of the cylinder 50, such means in the illustrated preferred construction of the invention being of such a character that operation of the measuring means imposes no load or torque whatsoever on the mechanical integrating device 46, particularly the cylinder 50. Such "no load" relationship between the measuring means and the cylinder 50 is deemed especially important in view of the fact that the cylinder 50 is driven solely by a friction drive, with such friction drive occurring through extremely limited areas of contact, namely, the contact between the pair of balls 52 and between the pair of balls 52 and the disk 48 and the cylinder 50. With no load or torque imposed on the cylinder 50 by the measuring means, the necessity for a very firm pressure contact between the pair of balls 52, the disk 48 and the cylinder 50 is considerably reduced so that the useful life of the components of the integrating device 46 can be expected to be substantially lengthened.

The means for measuring the angular displacement of the cylinder 50 discussed generally in the preceding paragraph in part comprises means for producing an electrical signal upon each equal increment of angular displacement of the cylinder 50, which in the preferred construction, takes the form of a disk 70 fixed upon an axial shaft 71 carried by the cylinder 50. The shaft 71 can be considered the output shaft of the mechanical integrating device. The disk 70 is provided with a plurality of equally spaced peripheral notches that extend entirely around the circumference of the disk 70. In actual practice, the disk 70 can conveniently be 1¼ inches in diameter and be provided with 24 notches each of which subtends a central angle of about 3¾° and which extends about ⅜ inch inwardly from the outer edge of the disk 70. An electric lamp 74 and a photoelectric cell 76 are disposed on opposite sides of the disk 70 in such an arrangement that light from the lamp 74 reaches the photoelectric cell 76 only when one of the notches 72 is disposed directly therebetween.

With such an arrangement, rotation of the cylinder 50 results in the photoelectric cell 76 being intermittently illuminated by light from the lamp 74 as the notches 72 pass therebetween. The lamp 74 can conveniently be a conventional six volt miniature screw base lamp having the commercial size designation of No. 47. The photoelectric cell 76 can conveniently be the commercially available Clairex Cl-3 cell. It will be apparent therefore that the cell 76 will produce an electrical potential or signal upon each occurrence of equal increments of rotation of the cylinder 50. The use made of the output of the photoelectric cell 76 is discussed subsequently in connection with FIGURE 2 of the drawings.

Upon further reference to FIGURE 1, it will be seen that, as a part of the recorder 10, an additional disk 78 is secured to the slide wire shaft 30 so as to rotate therewith. The disk 78 is provided with a peripheral notch 80 for use in conjunction with an electric switch 82. The electric switch 82 is rigidly mounted closely adjacent the periphery of the disk 78, by means not shown, and is of conventional character such that when the arm 84 is lowered from the position shown thereof in FIGURE 1, the switch 82 is closed. The outer end of the arm 84 is provided with a roller 86 that is spring pressed in rolling contact with the outer periphery of the disk 78 so that the switch 82 is closed only when the roller 86 drops into the notch 80 in the disk 78.

Figure 2:
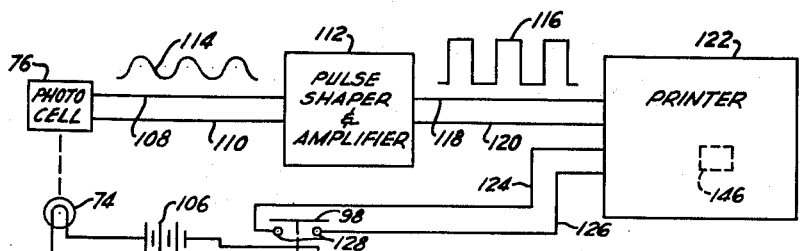
FIGURE 2 is a schematic wiring diagram of the apparatus shown in FIGURE 1.

Attention is now directed to the electrical circuitry illustrated in FIGURE 2, wherein the numeral 90 designates generally an electromagnetic relay comprised of an armature 92 that is connected to three contacting elements 94, 96, and 98. The relay 90 includes a solenoid 100 that is connected in series with a source of electrical energy, such as a battery 102 and the previously described switch 82. The armature 92 and the contacting elements 94, 96, and 98 occupy the positions shown thereof when the switch 82 is open. Thus, when the switch 82 is open, the contacting element 94 completes a series circuit including the motor 62 that rotates the disk 48 and a source of alternating electric current 104. Accordingly, whenever the switch 82 is open, the motor 62 is energized, but when the switch 82 is closed, the contacting element 94 is moved so as to open the series circuit of the motor 62 thereby de-energizing the latter. When the switch 82 is open, the contacting element 96 completes a series circuit that includes a battery 106 and the electric lamp 74, so that the lamp 74 is energized solely when the switch 82 is open.

The output of the photoelectric cell 76 is fed by leads 108 and 110 to a pulse shaper and amplifier 112 where the form of the pulse output of the photoelectric cell 76 is changed from such as that indicated at 114 to the square pulse shape indicated at 116. The output of the pulse shaper and amplifier 112 having the shape indicated at 116 is fed by leads 118 and 120 to a counting and printing means 122. The counting and printing means 122 is of conventional character, and is such that the same counts the number of electrical pulses fed thereinto until such time as the print demand circuit thereof is energized, whereupon the integer representing the number of pulses counted is printed upon a strip of paper with the counting means being reset to zero. Subsequent pulses result in a further count commencing from zero being made until such time as the print demand circuit is actuated to require a further digital printout and resetting of the counter to zero. Those skilled in the art are thoroughly familiar with such counting and printing means 122, and a further description of the same is deemed unnecessary. A number of suitable counting and printing means 122 are commercially available, one of which is designated as the Streeter Amet SCI Printing Counter. The print demand circuit of the counting and printing means 122 is connected by means of leads 124 and 126 to a pair of contacts 128 that operate in conjunction with the contacting element 98. The contacting element 98 bridges the contacts 128 solely when the relay 90 is actuated by closure of the switch 82. Each occurrence of the bridging of the contacts 128 by the contacting element 98 results in actuation of the print demand circuit of the counting and printing means 122 so as to cause a printout and resetting of the counting means to zero.

It is believed that the operation of the invention as thus far described will be easily understood. Operation of the self-balancing electronic strip chart recorder 10 results in the pen 36 producing a trace 42 on the chart paper 14 as previously explained. The integrating device 46 functions so that the angular displacement of the cylinder 50 constitutes a measure of the integral of the value recorded on the chart paper 14 by the trace 42 with respect to time where the disk 48 is driven at a constant speed, which is of course in synchronism with the constant linear velocity of the chart paper 14. The number of electrical pulses produced by the photoelectric cell 76 is proportional to the angular displacement of the cylinder 50, it being assumed that the values represented by the trace 42 are always zero or greater, since under such circumstances the rotation of the cylinder 50 is unidirectional.

The pulse output of the photoelectric cell 76 as modified by the pulse shaper and amplifier 112 is fed to the counting and printing means 122 and counted. Such count will continue so long as the switch element 82 is open; however, upon the switch element 82 closing, the relay 90 is actuated so that concomitantly the motor 62 is de-energized, the lamp 74 is de-energized and the contacting element 98 bridges the contacts 128 so as to actuate the print demand circuit of the counting and printing means 122 to cause a printout of the count and a resetting of the counter to zero. The notch 80 is so positioned on the periphery of the disk 78 that the switch 82 is closed only when the value represented by the trace 42 is less than a value preferably slightly above zero. Therefore, whenever the value being integrated is less than that for which the notch 80 is positioned to close the switch 82, integration is discontinued. This will normally introduce only an inconsequential error even over an extended period of time. During such interruption of integration, the disk 48 is caused to cease rotation and the lamp 74 is extinguished. As soon however as the value being integrated increases appreciably above zero, the switch 82 is opened so that the disk 48 resumes rotation and the lamp 74 is again lighted, and in addition the contacting element 98 moves so as to open the print demand circuit of the counting and printing means 122. Such conditions will continue to prevail with additional pulses being counted until such time as the value or function being integrated drops to a magnitude near zero (determined by the position of the notch 80), whereupon the total count obtained since the last time that the value being integrated was at or very near zero is printed and the counter reset to zero, with the disk 48 and the lamp 74 being de-energized until such time as the value being integrated again rises to a value appreciably above zero.

It will therefore be seen that each area under the trace 42 between adjacent zero or near zero values is independently recorded by the counting and printing means 122.

Figure 3:
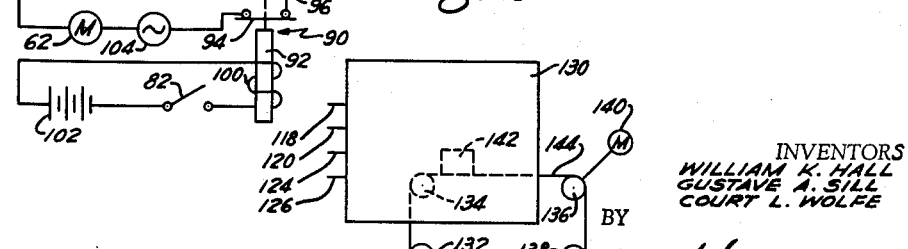
FIGURE 3 is a diagrammatic illustration of a modified form of the printer shown in FIGURE 2.

The counting and printing means 122 is subject to a modification which enables the printed output thereof on a strip of paper to be placed in or secured to the chart paper 14 record so that the printed counting results are oriented and placed in juxtaposition with the areas defined by the trace 44 of which they represent the integrals. Such modification of the printing and counting means 122 is schematically illustrated in FIGURE 3 wherein a modified counting and printing means is designated by the numeral 130 which is connected to the leads 118, 120, 124, and 126 in the same manner as the counting and printing means 122 shown in FIGURE 2. The modification of FIGURE 3 comprises means for advancing the strip of paper upon which the counting results are printed at a speed equal to that at which the chart paper 14 travels. Such means comprises a supply roll 132 of strip paper 144 from which paper is entrained over an idler roll 134, a driving roll 136 to a receiver roll 138. The driving roll 136 is continuously driven by a synchronous motor 140 so as to cause the strip of paper 144 to travel between the idler roll 134 to the driving roll 136 at a constant velocity by the printing assembly 142 of the counting and printing means 130. The driving connection between the motor 140 and the strip of paper 144 is such that the strip of paper 144 travels at the same velocity as that of the chart paper 14 over the roll 16. After a run of the recorder 10 and the counting and printing means 130, the strip of paper 144 can be placed in such an oriented relationship with respect to the corresponding record on the chart paper 14 so that the integrated results are adjacent to the recorded values of which they represent in the integral.

As an alternative arrangement of the embodiment of the invention shown in FIGURE 3, the printing assembly 146 of the counting and printing means 122 can be removed from the balance of the counting and printing means 122 and rigidly positioned with respect to the roll 16 as shown in FIGURE 1 so that printing assembly 146 prints directly upon the chart paper 14 as the latter moves over the roll 16. Thus the printouts would automatically be made on the chart paper 14 in oriented relation to the trace 42.

As previously mentioned, the illustrated means for producing electrical pulses representing the angular translation of the cylinder 50 is of special value inasmuch as the same imposes no load or torque on the cylinder 50. The stopping of the drive for the disk 48 when the value being integrated is of near zero magnitude is of importance in preventing wear on the integrating device 46, as the balls 52 are especially subjected to wear when near the center of the disk 48. With the illustrated and described arrangement, such wear cannot occur when the balls 52 are near the center of the disk 48 for the reason that the disk 48 is not rotated. The arrangement for extinguishing the lamp 74 is of importance when it is desired to integrate the values of a variable only insofar as they exceed a predetermined value, in which case the notch 80 on the disk 78 would be elongated and angularly positioned so as to actuate the switch 82 to the closed position whenever the value of the variable being integrated has such predetermined value or less. Notwithstanding the fact that positioning the notch 80 in such a manner would cause de-energization of the motor 62 when the value of the variable falls below such predetermined value, it is to be expected that the disk 48 could coast so as to result in an unwanted counting were it not for the additional fact that the lamp 74 is extinguished preventing such counting.

The subject invention is susceptible of numerous variations without departing from the spirit thereof. For example, in the event that the variable being measured fluctuates in close proximity to a zero value, the switch 82 may be operated so frequently that the shaft 71 rotates to such a small extent between such actuations of switch 82 that few if any notches 72 pass between the lamp 74 and the photoelectric cell 76 between successive closures of the switch 82. In such an event, the counting and printing means 122 or the modified counting and printing means 130 will print a succession of zeros or very low integers which will ordinarily be of no great significance. Such frequent successive actuations of the print demand circuit for printout does not impair the value of counts of appreciable magnitude but merely dilutes the meaningful data with what may be essentially meaningless data. If such operation is deemed undesirable or a nuisance, it will be evident to those skilled in the art that an additional switch means can be provided for co-operation with the switch means 82 such that printout cannot occur until after the variable being integrated has taken on a value a predetermined extent greater than that which is required to have last closed the switch 82. Such an arrangement would prevent printouts whenever the count is less than that which would be of significance as an integral of the variable being integrated. This sort of arrangement creating in effect a dead band is conventional and is certainly within the province of those skilled in the art.

It will be appreciated that the apparatus of the invention is particularly useful in connection with many analytical procedures, notably chromatographic or spectrographic processes or techniques. For example, in the event that the apparatus of this invention is to be used for processing chromatographic data, the electrical potential produced by the usual thermoconductivity cell arrangement provided for analyzing the effluent stream would be fed to the self-balancing electronic strip chart recorder 10 as the input signal. Thus, the various separate integration results obtained by the illustrated apparatus would represent values closely related to the amounts of the various constituents in the effluent stream from the chromatographic column.

The linear or constant rise cam 44 results in faithfully producing numerical results that are essentially directly proportional to the real areas under the curve 42. It is within the scope of the invention that the numerical results can bear other forms of mathematical dependency upon the real areas under the curve 42. For example, the cam 44 can have a logarithmic rise so that the displacement of the cam follower 56 is directly proportional to the logarithm of the angular displacement of the shaft 30. With such modification of the cam 44, the numerical results produced by the counting and printing means 122 are directly proportional to the integral of the logarithm of the variable electrical signal fed to the recorder 10 with respect to time. This modification of the cam 44 is especially useful when the apparatus of the invention is used for quantitative absorption spectral analysis.

Designating the value of the variable signal fed to the recorder 10 by the symbol $x$, it will be seen that each printed numerical result obtained is equal to the quantity $\int f(x) dt$ during the time interval between successive operations of the switch 82. With a constant rise cam, $f(x)$ is obviously $x$, while with the logarithmic cam described, $f(x) = \log x$. It is clearly within the province of those skilled in the art that the cam 44 can be shaped to make $f(x)$ any desired mathematical function of $x$.

It is also within the scope of the invention that the angular displacement of the shaft 30 can be other than linear with respect to the variable input signal, as where for example the recorder 10 includes a conventional logarithmic slide wire. Irrespective of whatever mathematical dependency exists between the angular displacement of the shaft 30 and the variable input signal, the cam 44 can still be shaped to afford whatever mathematical relationship between the displacement of the cam follower 56 and the value of the variable input signal that may be desired.

Whether using a constant rise cam 44 or any other modification of the cam 44, the length of the cam follower 56 can be such as to place the ball means 52 at any radial position of the disk 48 for a particular value of the input signal, either above or below the center of the disk 48 as viewed in FIGURE 1. Such latitude in possible combinations of the character of the cam 44, the length of the cam follower 56, and the position of the notch 80, permits a vast number of possible utilizations of the apparatus. For example, integrals of functions of the variable input signal can be printed, whether positive or negative (though those of negative character must be ascertained from an examination of the trace 42), as the input signal varies above and below the value thereof corresponding to actuation of the switch 82.

Though the counting and printing means 122 have been described solely in connection with the printing of numerical results as ordinary Arabic numerals, it will be appreciated that the printing arrangement can be modified so that the results are intelligible to high speed computers. For example, the printer 146 can be arranged to punch results upon cards suitable for feeding to IBM computing machines, or the printer can be arranged to print (magnetically) upon magnetic tape suitable for feeding to electronic computers, such as the well known Univac. Printing in a manner intelligible to high speed computers will greatly facilitate and expedite interpretation of the results obtained in the use of the illustrated apparatus. It is in such broader sense of the meaning of the word "printing" or "recording" that these words are used in the claims in connection with the output of the integrator.

Although the feature of the counter being reset to zero on printout is important, such feature and the convenience thereof can be omitted and cumulative total counts printed, it being noted that with such omission the printouts will still occur when the switch 82 closes at a predetermined value of the input signal.

The invention has been described in substantial detail in order to insure a complete and full understanding of the principles thereof, and any narrowness in scope of the invention is not to be implied by reason of the detailed description thereof. The actual scope of the invention should be ascertained upon reference to the appended claims.

We claim:

1. In a recorder system of the class wherein a self-balancing potentiometric recorder includes a recording pen contacting a moving chart so that the magnitude of an electrical signal fed to the recorder is traced by the pen on the chart; the combination with said recorder of integrator means for recording a value that is linear with the value of the integral of the magnitude of the electrical signal with respect to time during each time interval occurring between successive instances that the electrical signal has a predetermined magnitude, said integrator means comprising a mechanical integrating device, said device comprising a rotatable disk, a cylinder rotatable on an axis normal to the axis of rotation of the disk, motion transferring means for establishing a variable ratio driving connection between the disk and the cylinder, mechanical driving means connecting the recorder to the motion transferring means for translating the latter along a path parallel to the axis of the cylinder and normal to the axis of rotation of the disk, said mechanical driving means translating the motion transferring means in the same sense and in direct proportion to the variations of the electrical signal, means for rotating the disk at a constant velocity, printing counter means for printing on a strip of paper, said printing counter means including a counting circuit and a print demand circuit, means for producing an electrical pulse upon each equal increment of rotation by the cylinder and also for feeding such pulse to the counting circuit, said print demand circuit including a switch, means on the recorder and connected to said switch for actuating the switch upon the electrical signal being of said predetermined magnitude to cause printout, and means on said recorder for interrupting the operation of the means for producing the electrical pulses when the electrical signal has a magnitude less than said predetermined magnitude and concomitantly interrupting the operation of the means for rotating the disk.

2. In a recorder system of the class wherein a self-balancing potentiometric recorder includes a recording pen contacting a moving chart so that the magnitude of an electrical signal fed to the recorder is traced by the pen on the chart; the combination with said recorder of integrator means for recording a value that is linear with the value of the integral of the magnitude of the electrical signal with respect to time during each time interval occurring between successive instances that the electrical signal has a predetermined magnitude, said integrator means comprising a mechanical integrating device, said device comprising a rotatable disk, a cylinder rotatable on an axis normal to the axis of rotation of the disk, motion transferring means for establishing a variable ratio driving connection between the disk and the cylinder, mechanical driving means connecting the recorder to the motion transferring means for translating the latter along a path parallel to the axis of the cylinder and normal to the axis of rotation of the disk, said mechanical driving means translating the motion transferring means in the same sense and in direct proportion to the variations of the electrical signal, means for rotating the disk at a constant velocity, printing counter means, said printing counter means including a counting circuit and a print demand circuit, said print demand circuit including a printing assembly disposed adjacent the moving chart for printing thereon, means for producing an electrical pulse upon each equal increment of rotation by the cylinder and also for feeding such pulse to the counting circuit, said print demand circuit including a switch, and means on the recorder and connected to said switch for actuating the switch upon the electrical signal being of said predetermined magnitude to cause printout and means on the recorder for concomitantly interrupting operation of said means for rotating the disk and said means for producing an electrical pulse upon said electrical signal being below said predetermined magnitude.

3. In a recorder system of the class wherein a self-balancing potentiometric recorder includes a recording pen contacting a moving chart so that values that are a function of the magnitude of an electrical signal fed to the recorder are traced by the pen on the chart; the combination with said recorder of integrator means for recording the absolute value of a value that is linear relative to the integral of a function of the magnitude of the electrical signal with respect to time during each time interval occurring between successive instances that the electrical signal has a predetermined magnitude, said integrator means comprising a mechanical integrating device, said device comprising a rotatable disk, a cylinder rotatable on an axis normal to the axis of rotation of the disk, motion transferring means for establishing a variable ratio driving connection between the disk and the cylinder, mechanical driving means connecting the recorder to the motion transferring means for translating the latter along a path parallel to the axis of the cylinder and normal to the axis of rotation of the disk, said mechanical driving means including a cam for causing the translating of the motion transferring means to be a predetermined function of the magnitude of the electrical signal, means for rotating the disk at a constant velocity, printing counter means, said printing counter means including a counting circuit and a print demand circuit, means for producing an electrical pulse upon each equal increment of rotation of the cylinder and also for feeding the pulse to the counting circuit, said print demand circuit including a switch, means on the recorder and connected to said switch for actuating the switch upon the electrical signal being of said predetermined magnitude and means on the recorder for concomitantly interrupting operation of said means for rotating the disk and said means for producing an electrical pulse upon said electrical signal being below said predetermined magnitude.

4. An integrating system for integrating a function comprising a mechanical integrating device, said device comprising a rotatable disk, a cylinder rotatable about an axis normal to the axis of rotation of the disk, motion transferring means establishing a frictional driving connection between the disk and the cylinder, said motion transferring means being moveable along positions in a path parallel to the axis of the cylinder, means responsive to said function for moving said motion transferring means along said path, means for rotating the disk, angular displacement measuring means for measuring the angular displacement of the cylinder, means responsive to the positioning of said motion transferring means for concomitantly energizing said disk rotating means and said angular displacement measuring means, and means responsive to the positioning of said motion transferring means for concomitantly deenergizing said disk rotating means and said angular displacement measurement means.

5. An integrating system for integrating a function comprising a mechanical integrating device, said device comprising a rotatable disk, a cylinder rotatable upon an axis normal to the axis of rotation of the disk, motion transferring means establishing a frictional driving connection between the disk and the cylinder, said motion transferring means being moveable along positions in a path parallel to the axis of the cylinder, means responsive to said function for moving said motion transferring means along said path, disk rotating means, angular displacement measuring and recording means for measuring and recording the angular displacement of the cylinder, means responsive to the positioning of said motion transferring means for concomitantly deenergizing said disk rotating means and said angular displacement measuring and recording means.

6. An integrating system for integrating a function comprising a mechanical integrating device, said device comprising a rotatable disk, a cylinder rotatable upon an axis normal to the axis of rotation of the disk, motion transferring means establishing a frictional driving connection between the disk and the cylinder, said motion transferring means being moveable along positions in a path parallel to the axis of the cylinder, means responsive to said function for moving said motion transferring means along said path, disk rotating means, signal producing means for producing an electrical signal upon each equal increment of angular displacement of the cylinder, means for counting the electrical signals, means responsive to the positioning of said motion transferring means for concomitantly deenergizing said signal producing means and said disk rotating means.

7. An integrating system for integrating a function comprising a mechanical integrating device, said device comprising a rotatable disk, a cylinder rotatable upon an axis normal to the axis of rotation of the disk, motion transferring means establishing a frictional driving connection between the disk and the cylinder, said motion transferring means being moveable along positions in a path parallel to the axis of the cylinder, means responsive to said function for moving said motion transferring means along said path, disk rotating means, photoelectric means for producing an electrical signal upon each equal increment of angular displacement of the cylinder, means for counting the electrical signals, means responsive to the positioning of said motion transferring means for concomitantly deenergizing said photoelectric means and said disk rotating means.

8. An integrating system for integrating a function comprising a mechanical integrating device, said device comprising a rotatable disk, a cylinder rotatable upon an axis normal to the axis of rotation of the disk, motion transferring means establishing a frictional driving connection between the disk and the cylinder, said motion transferring means being moveable along positions in a path parallel to the axis of the cylinder, means responsive to said function for moving said motion transferring means along said path, disk rotating means, signal producing means for producing an electrical signal upon each equal increment of angular displacement of the cylinder, printing counter means including a counting circuit connected to the signal producing means and also a print demand circuit, an energizing-deenergizing means responsive to the positioning of said motion transferring means for deenergizing said signal producing means, deenergizing said disk rotating means and energizing the print demand circuit concomitantly.

9. A mechanical integrating device for integrating a function comprising a rotatable disk, a cylinder rotatable upon an axis normal to the axis of rotation of the disk, motion transferring means establishing a frictional driving connection between the disk and the cylinder, said motion transferring means being movable along positions in a path parallel to the axis of the cylinder, means responsive to said function for moving said motion transferring means along said path, electrically actuated disk rotating means, additional electrically actuated means for producing an electrical signal upon each equal increment of angular displacement of the cylinder, and means responsive to the positioning of said motion transferring means for concomitantly deenergizing both of said electrically actuated means.

10. In a mechanical device for integrating a function of the type including a rotatable output shaft and a motion transferring means that is moveable by means responsive to said function along positions in a fixed path in order to vary the rate of rotation of the output shaft, means for producing an electrical pulse upon each equal increment of angular displacement of the output shaft, means for counting the electrical pulses so produced, and means responsive to the positioning of the motion transferring means for concomitantly deenergizing the electrical pulse-producing means and said mechanical integrating device.

11. In a mechanical device for integrating a function of the type including a rotatable output shaft and a motion transferring means that is moveable by means responsive to said function along positions in a fixed path in order to vary the rate of rotation of the output shaft, means including a lamp and a photoelectric cell for producing an electrical pulse upon each equal increment of angular displacement of the output shaft, means for counting the electrical pulses so produced, and means responsive to the positioning of said motion transferring means for concomitantly extinguishing the lamp and deenergizing said mechanical integrating device.

References Cited in the file of this patent

UNITED STATES PATENTS

| | | |
|---|---|---|
| 2,414,086 | Brewer | Jan. 14, 1947 |
| 2,415,879 | Hassler | Feb. 18, 1947 |
| 2,469,673 | Whitmore | May 10, 1949 |
| 2,481,039 | Ross | Sept. 6, 1949 |
| 2,539,835 | Heynisch | Jan. 30, 1951 |
| 2,544,919 | Dueringer | Mar. 13, 1951 |
| 2,665,065 | Davidson | Jan. 5, 1954 |
| 2,714,547 | Francis | Aug. 2, 1955 |
| 2,716,340 | Nance et al. | Aug. 30, 1955 |
| 2,746,833 | Jackson | May 22, 1956 |
| 2,768,785 | Silvertooth | Oct. 30, 1956 |

UNITED STATES PATENT OFFICE
CERTIFICATE OF CORRECTION

Patent No. 3,028,213                                         April 3, 1962

William K. Hall et al.

It is hereby certified that error appears in the above numbered patent requiring correction and that the said Letters Patent should read as corrected below.

Column 1, lines 20 and 37, for "ball", each occurrence, read -- motion transferring --.

Signed and sealed this 24th day of July 1962.

(SEAL)
Attest:

ERNEST W. SWIDER                                    DAVID L. LADD
Attesting Officer                                        Commissioner of Patents